United States Patent [19]
Yasuda et al.

[11] Patent Number: 4,939,051
[45] Date of Patent: * Jul. 3, 1990

[54] GRID FOR USE IN LEAD ACID BATTERIES AND PROCESS FOR PRODUCING SAME

[75] Inventors: Hiroshi Yasuda; Sadao Furuya, both of Toyohashi; Naoto Hoshihara, Shizuoka; Takashi Yamaguchi, Kosai; Katsuhiro Takahashi, Toyohashi; Teruaki Ishii, Kosai, all of Japan

[73] Assignee: Matsushita Electric Industrial Co., Ltd., Osaka, Japan

[*] Notice: The portion of the term of this patent subsequent to Feb. 21, 2006 has been disclaimed.

[21] Appl. No.: 282,733

[22] Filed: Dec. 12, 1988

Related U.S. Application Data

[63] Continuation-in-part of Ser. No. 135,485, Dec. 21, 1987, Pat. No. 4,805,277, which is a continuation of Ser. No. 870,781, Jun. 5, 1986, abandoned.

[51] Int. Cl.$^5$ .............................................. H01M 4/68
[52] U.S. Cl. ............................................. 429/245; 29/2
[58] Field of Search ...................... 29/2; 429/245, 242

[56] References Cited

U.S. PATENT DOCUMENTS

| | | | |
|---|---|---|---|
| 2,678,340 | 5/1954 | Stoertz | 429/245 |
| 4,035,556 | 7/1977 | Duddy et al. | 429/245 |
| 4,092,462 | 5/1978 | Giess et al. | 429/245 |
| 4,107,407 | 8/1978 | Koch | 429/245 |
| 4,279,977 | 7/1981 | Matter | 429/245 |
| 4,443,918 | 4/1984 | Morinari et al. | 29/2 |
| 4,805,277 | 2/1989 | Yasuda et al. | 29/2 |

FOREIGN PATENT DOCUMENTS

| | | | |
|---|---|---|---|
| 2721560 | 11/1978 | Fed. Rep. of Germany | 429/242 |
| 0066868 | 5/1980 | Japan | 429/245 |
| 0167268 | 8/1985 | Japan | 29/2 |
| 0232668 | 11/1985 | Japan | 29/2 |

Primary Examiner—Donald L. Walton
Attorney, Agent, or Firm—Stevens, Davis, Miller & Mosher

[57] ABSTRACT

The present invention provides a process for producing a grid for use in lead acid batteries which comprises superposing, on a sheet bar of a lead-calcium alloy, a sheet or a foil of a lead-silver-tin alloy consisting of 0.01–1.0% by weight of tin and a residual quantity of lead and having a thickness smaller than that of the sheet bar, pressure-bonding both the materials by cold rolling to prepare an elementary sheet, and subjecting the elementary sheet to an expanding process or a punching process.

The grid obtained according to the process of the invention is improved in the charge-discovery characteristics after overdischarging and standing and does not deteriorate the maintenance-free characteristic of lead-calcium-tin alloy.

7 Claims, 4 Drawing Sheets

FIG. I

GRID FOR USE IN LEAD ACID BATTERIES AND PROCESS FOR PRODUCING SAME

CROSS REFERENCE TO RELATED APPLICATIONS

This is a continuation-in-part of U.S. application Ser. No. 135,485 filed Dec. 21, 1987 now U.S. Pat. No. 4,805,277 which in turn is a continuation of application Ser. No. 870,781 filed June 5, 1986, now abandoned.

BACKGROUND OF THE INVENTION

1. Technical Field of the Invention

The present invention relates to lead acid batteries for use as an electric source for automobiles and in other fields, and more particularly to a grid for use in lead acid batteries and a process for producing said grid.

2. Prior Art

Currently, there is an increasing tendency to use a lead-calcium alloy as the grid for lead acid batteries because of its excellent properties, i.e. a small loss in electrolytic solution after assemblage of battery and only a slight self-discharge during storage.

As compared with the lead-antimony alloy which has been used prior to lead-calcium alloy, however, the lead-calcium alloy is inferior in castability and mechanical strength after casting. For these reasons, it has hitherto been conventional to form a lead-calcium alloy into a grid by rolling its ingot into a sheet and then subjecting the sheet to an expanding treatment.

Although lead acid battery using a grid made of lead-calcium alloy is excellent in the lifetime in charge-discharge cycle (a light discharge not exceeding 5% of the capacity in an atmosphere having a temperature of 40° C.), while its lifetime in the charge-discharge cycle in an atmosphere having a high temperature (exceeding 70° C.) tends to decrease rapidly. Today, temperature in the engine room of automobiles tends to become high due to the increasing elaborateness of engine room itself and the stagnation in traffic, so that the high temperature durability of lead acid battery as an electric source placed in engine room is an important problem.

One object of the present invention is to provide a grid for use in lead acid batteries which solves the above-mentioned problems, and a process for producing said grid.

Another object of the present invention is to obtain a grid for use in lead acid batteries by a process which comprises superposing a sheet or a foil of a lead-silver alloy or a lead-silver-tin alloy on a sheet bar of a lead-calcium-tin alloy, said sheet or foil of a lead-silver or lead-silver-tin alloy having a thickness smaller than that of the sheet bar, followed by subjecting the superposed materials to a cold rolling to form an elementary sheet in which both the materials are integrated and then subjecting the elementary sheet to an expanding or punching process.

Yet, further object of the present invention is to provide a grid for use in lead acid batteries which is easy to produce, low in cost and excellent in cycle lifetime at high temperatures.

SUMMARY OF THE INVENTION

According to the present invention, a grid is formed by superposing a sheet or a foil of a lead-silver alloy or a lead-silver-tin alloy (preferably, an alloy consisting of 0.01–1.0% by weight of silver 0–10.0% by weight of tin and a residual quantity of lead) on a sheet bar of a lead-calcium-tin alloy, said sheet or foil of a lead-silver or a lead-silver-tin alloy having a thickness smaller than that of the sheet bar, followed by subjecting the superposed materials to a cold rolling to pressure-bond and integrate both the materials and to produce an elementary sheet having a thickness smaller than that of the sheet bar and then subjecting the elementary sheet thus obtained to an expanding process of a punching process.

By applying a pressure bonding cladding process by cold rolling in the above-mentioned manner and using a grid having a superficial layer of enhanced silver concentration, it is possible to suppress the progress of the superficial oxidative corrosion of the grid into the inner part of the grid.

Thus, the deformation of the grid due to progress of oxidative corrosion of grid can be suppressed. Particularly at high temperatures, tensile strength of the lead alloy grid decreases rapidly. Further, at high temperatures, the progress of oxidative corrosion becomes rapid, which promotes the deformation of grid. Accordingly, prevention of the progress of oxidative corrosion has a marked effect on the prevention of deformation.

Further, the preventive effect on the oxidative corrosion is additionally increased by enhancing the tin concentration in the superficial layer having a high silver concentration. This is probably for the reason that the adhesion between the grid and the pasty active material filled therein is enhanced and thereby a tight adhesion can be maintained for a long period of time. That is, owing to the strengthened bonding between the grid and the active material, evolution of gas due to overcharge is promoted at the surface of active material while the gas evolution at the interface between grid surface or metallic part of grid and the superficial oxide layer is suppressed, as the result of which crack formation or peeling at the interface is prevented.

One of the disadvantages of prior batteries using a grid of lead-calcium alloy has been the low charge-discovering ability after overdischarge and standing. This disadvantage can be overcome by enhancing the tin concentration in the superficial layer of grid. A similar effect can be achieved also by enhancing the silver concentration in the superficial layer of grid.

As above, a great effect can be achieved by modifying only a part of the interficial area of grid contacted with active material.

Particularly, such ideas as forming a thin alloy layer different from sheet bar in composition on the surface of a grid made from a sheet bar of lead-calcium alloy, for example a method of forming an antimony alloy layer on the surface of a sheet bar of antimony-less lead-calcium alloy, and the like have already been proposed and disclosed. However, it has been unknown up to today that the durability in an atmosphere of high temperature which has recently become attracting public interests as an important problem can be effectively improved by incorporating silver into the superficial layer of grid and by forming the silver-containing layer on only oneside of the grid. This fact which the inventors have discovered for the first time constitutes one important characteristic feature of the present invention.

Generally speaking, the pressure-bonding cladding process is effective for achieving a high bonding strength if combined with a heat treatment such as hot rolling process. The present inventors also found that a hot rolling process which comprises heating a sheet bar of lead alloy to a temperature higher than its recrystallization temperature, superposing a lead-silver alloy on the heated sheet bar and rolling the superposed materials is effective for enhancing the bonding strength between the two layers. However, there is a tendency that, according to this method, the lead sheet cannot exhibit a sufficient time-hardening effect so that tensile strength becomes low. In view of above, the present inventors have studied the optimum conditions of cladding on the premise that a sheet bar of lead alloy is subjected to cold rolling at a temperature not higher than the recrystallization temperature of the alloy. As the result, it has been found that a clad sheet having a bonding strength enough to endure the expanding process can be produced by making the thickness of the lead-silver alloy superposed on the sheet bar small (preferably 0.7 mm or less) and adjusting the rolling ratio (the ratio of thickness of elementary material before rolling to the thickness of rolled sheet) to a value of 5 or more. According to this process, a high sheet strength and a high bonding strength at the bonded surface can both be achieved simultaneously. Further, the procedure is so simple that a mere pressure bonding of different metals is enough for the purpose. Further the clad material has a high dimensional accuracy regarding thickness, and the process is accompanied with no material loss. The expanded grid obtained by this process has a predetermined thickness of a silver-containing layer containing a predetermined concentration of silver on its surface. Further, it has also been revealed that, if the lead alloy of sheet bar contains tin and the superficial layer is made of a lead alloy containing tin in addition to silver, their cold rolling gives a more enhanced strength of pressure bonding.

DESCRIPTION OF EXAMPLES

Hereunder, examples of the invention will be mentioned.

EXAMPLE

Figure 1:
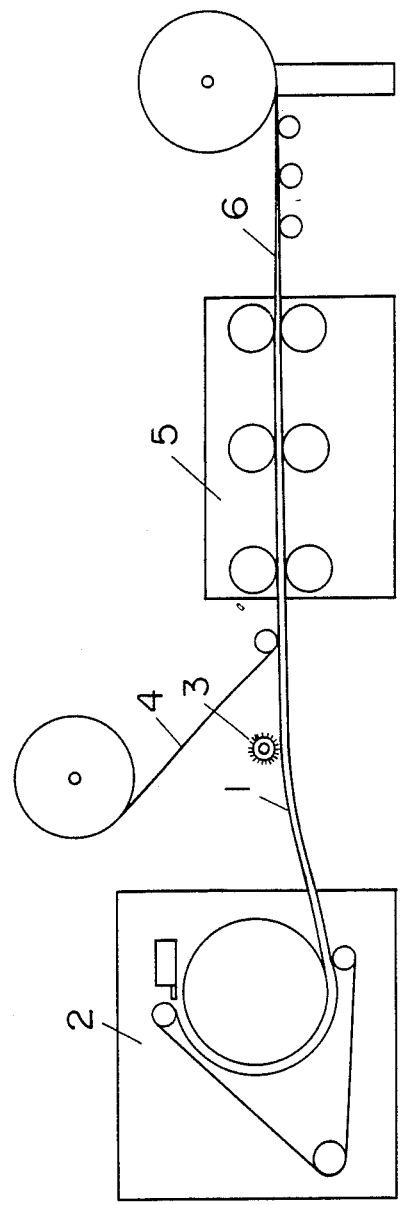
FIG. 1 is an schematic illustration of the process for producing the ribbon-like sheet-form elementary material used for the production of the grid of the invention.
Figure 2:
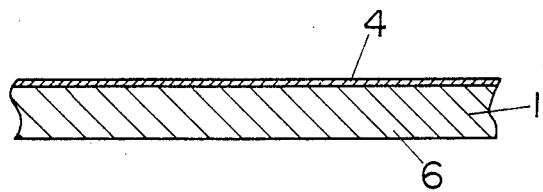
FIG. 2 is an enlarged sectional view of the sheet-form elementary material.

As shown in FIG. 1, a sheet bar of lead-calcium-tin alloy 1 was continuously formed into a ribbon by means of sheet bar caster 2. The sheet bar 1 has a thickness of 10 mm and a width of 80 mm. As for the composition, lead-calcium-tin alloys containing 0.05-0.1% by weight of calcium and 0.2-0.5% by weight of tin are preferred. In the present experiment, a lead-calcium-tin alloy composed of 0.07% by weight of calcium, 0.25% of tin and a residual quantity of lead was used. At the outlet of sheet bar caster 2, the sheet bar 1 had a temperature of about 150° C. which was lower than the recrystallization temperature of the alloy. One surface of the ribbon-like sheet bar 1 was briefly ground with buff 3. Then, two sheets per one run of lead-silver alloy 4, having a thickness of 1.2, 1.0, 0.7, 0.5, 0.3 or 0.1 mm, having a width of 20 mm throughout all the runs and containing 0.3% by weight of silver throughout all the runs, were placed thereon in parallel with each other at an interval of 20 mm. Thereafter, the whole was passed through a continuous multi-stage rolling mill 5 equipped with three or more stages of rolls to prepare a lead alloy sheet 6 having the same width of 80 mm. FIG. 2 illustrates this rolled lead alloy sheet. The surface of the rolled sheet was constituted of a thin layer, having a thickness of 0.5-1.0% based on the total thickness of the sheet, of lead-silver alloy 4 pressure-bonded from the surface of the sheet into the inside of the sheet onto the sheet bar which was a layer of lead-calcium-tin alloy 1. The final thickness of the sheets were 2.5, 2.25, 2.0, 1.75, 1.5, 1.25, 1.0 and 0.6 mm.

Each of the lead-alloy sheets thus obtained was bent so that the lead-silver alloy layer come outside, and the state of peeling was investigated. The results were as shown in Table 1. In all the runs where the total thickness of the final alloy sheet was smaller than 0.2 mm, the thickness of lead-silver alloy sheet was 0.7 mm or less and the rolling ratio to the initial thickness of sheet bar was 5 or more, a good lead alloy sheet allowing no peeling of the lead-silver alloy sheet from the sheet bar was obtained. When the total thickness of the final sheet was 1.0 mm or 0.6 mm, a good result was obtained even if the thickness of lead-silver alloy sheet was increased to 1.0 mm or 1.2 mm, respectively.

TABLE 1

| Thickness of final sheet (mm) | Rolling ratio | Bonding strengths Thickness of lead-silver alloy layer | | | | | |
|---|---|---|---|---|---|---|---|
| | | 0.1 mm | 0.3 mm | 0.5 mm | 0.7 mm | 1.0 mm | 1.2 mm |
| 0.6 | 16.7 | | | | | | |
| 1.0 | 10 | | | | | | |
| 1.25 | 8 | | | | | | Δ | X |
| 1.5 | 6.7 | | | | | X | X |
| 1.75 | 5.7 | | | | | X | X |
| 2.0 | 5 | | | | | X | X |
| 2.25 | 4.44 | | | | Δ | X | X |
| 2.5 | 4 | | | X | X | X | X |

In Table 1, mark O means that the pressure-bonding was so tight that no peeling took place in the clad part when the pressure-bonded sample was bent. Mark Δ means that the major part of the pressure-bonded sample showed no peeling although peeling took place in some parts of the sample. Mark X means that peeling took place in the clad part when the sample was bent.

Figure 3:
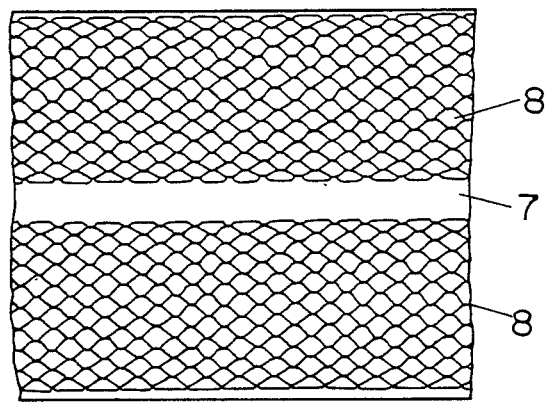
FIG. 3 is a top view of the sheet-form material having been subjected to an expanding process.
Figure 4:
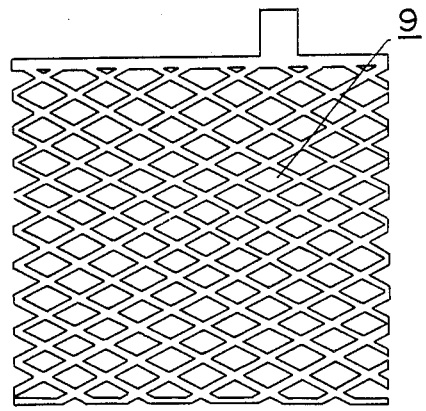
FIG. 4 is a top view of the grid cut out from the expanded sheet.

Then, each of the sheets was subjected to an expanding process in the usual way to obtain a product shown in FIG. 3 where the central area 7 was left unexpanded and the left and right areas were expanded into diamond-shaped networks 8, after which the product was cut into predetermined size and shape to obtain a grid 9 shown in FIG. 4. The lug for withdrawing the current provided on the upper header of the grid was cut out of the central unexpanded area of the rolled sheet, so that it was formed of the lead-calcium-tin alloy constituting the sheet bar.

Figure 5:
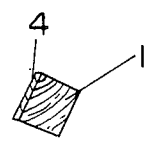
FIG. 5 is an enlarged sectional view of the skeletal part of the grid.

As shown in the enlarged view of FIG. 5, the section of skeletal part of this grid 9 was so constructed that a thin layer of lead-silver alloy 4 was pressure-bonded onto one side of lead-calcium-tin alloy layer 1. The lead-silver alloy layer 4 was inclined toward the inner side of grid mesh due to the twisting force arising at the time of expanding processing.

This expanded grid was used as a positive electrode, and a pasty active material was filled thereinto in the usual way to obtain automobile lead acid battery A. Further, acid battery B was prepared by using a grid prepared by pressure-bonding an alloy sheet containing 0.3% by weight of silver and 5% by weight of tin onto one side of sheet bar. Further, for comparison, a usual battery C was also prepared by repeating the above-mentioned procedure except that the pressure-bonding treatment using lead-tin alloy sheet was not carried out. All these batteries had a form of 12 V - 55D23.

The batteries A, B and C were subjected to SAE lifetime test in an atmosphere having a high temperature of 70° C.

Figure 6:
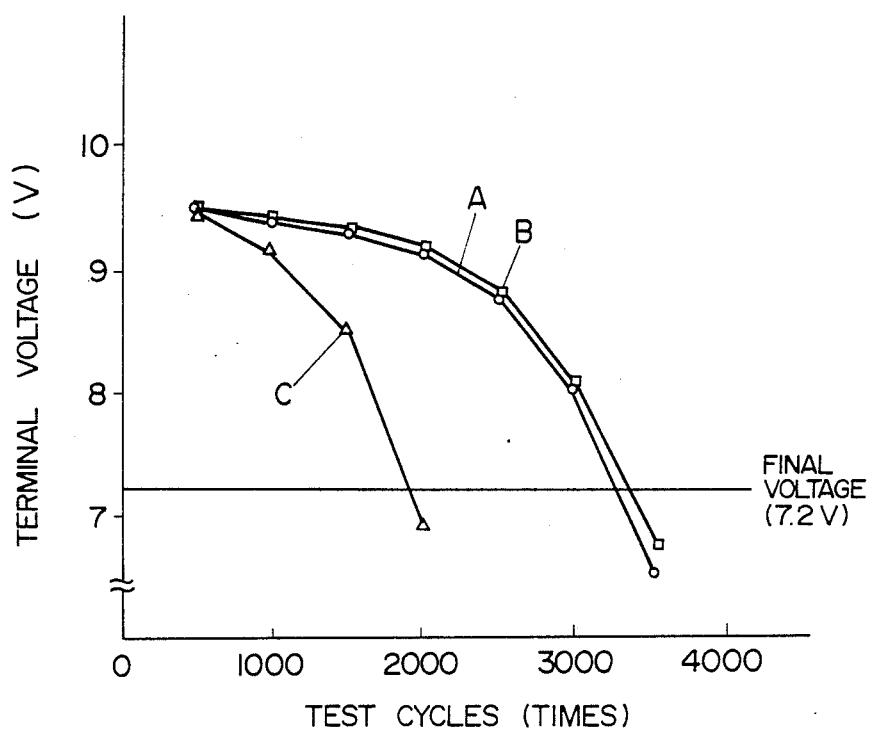
FIG. 6 is curves illustrating the results of SAE lifetime test of an acid battery using the grid of the present invention, conducted at 70° C.

Discharging was carried out at 25 A for 4 minutes, and charging was carried out at 14.8 V for 10 minutes at a maximum current of 25 A. Taking one sequence of this charging and discharging as one cycle, a discharging of 310 A was carried out for 30 seconds at intervals of 480 cycles. When the voltage at the 30th second had reached 7.2 V or below, the cycle number till this time was regarded as the lifetime. As the result, acid battery C (comparative sample) showed a lifetime shorter than about 2,000 cycles, while acid batteries A and B using a grid of the present invention showed a lifetime exceeding 3,000 cycles, indicating their improvement in the durability at high temperatures. One example of the results is shown in FIG. 6.

In the example presented above, only one surface of sheet bar made of lead-calcium-tin alloy was subjected to pressure-bonding treatment using a lead-silver or lead-silver-tin alloy sheet by cold rolling. Apart from such an embodiment, it is also possible, of course, to subject both surfaces of the sheet bar to a cladding treatment using a sheet or a foil of lead-silver alloy.

If a grid is formed by an expanding processing of a sheet-form elementary material prepared by integrating a sheet bar of lead-calcium-tin alloy with a lead-silver alloy sheet by cold rolling as has been mentioned above, the smallness of the tendency of self-discharge or the maintenance-free characteristics of the alloy sheet bar can be sufficiently utilized, and at the same time corrosion of the grid and its deformation at high temperature can be prevented and its durability can be improved.

For this purpose, the lead-calcium alloy used as the sheet bar should preferably consist of 0.05–0.1% by weight of calcium, 0.2–0.5% by weight of tin and a residual quantity of lead as has been mentioned above, and more preferably it should consist of 0.06–0.08% by weight of calcium, 0.2–0.3% by weight of tin and a residual quantity of lead.

On the other hand, the sheet- or foil-form lead alloy to be pressure-bonded onto the surface of sheet bar should consist of 0.01–1.0% by weight of silver, 0–10.0% by weight of tin and residual quantity of lead, and preferably consist of 0.1–0.5% by weight of silver, 1–8% by weight of tin and a residual quantity of lead. More preferably, it should be a lead-silver-tin alloy consisting of 0.2–0.4% by weight of silver, 4–6% by weight of tin and a residual quantity of lead.

In this sheet- or foil-form lead-silver-tin alloy, the silver so functions that the silver existing between lead particles keep a high electrical conductivity between the particles and exhibits a sufficient expandability on the surface of sheet bar at the time of pressure-bonding by cold rolling owing to the high ductility and malleability of itself. The tin improves the affinity to sheet bar at the time of pressure-bonding and thereby realizes integration with the sheet bar upon cold rolling. If its content increases, however, cost becomes higher and the product becomes too soft which deteriorates the integration with sheet bar upon cold rolling.

Further, by keeping the temperature of alloy sheet bar at 130° C. to 180° C. at the time of cold rolling, a temperature lower than the recrystallization temperature (the temperature at which the crystal particles of sheet bar alloy become coarse) can be maintained, and thereby a high pressure-bonding strength of rolled sheet and a fine size of alloy particles can be retained.

If the rolled sheet is left standing for a necessary period of time after the pressure-bonding, its time-hardening effect can be exhibited and thereby the tensile strength of sheet can be increased.

As the shape of grid, a diamond-shaped network by the expanding process is desirable from the viewpoint of material yield. However, a punched board prepared by forming holes of desired shape by punching process is also usable.

Next, another example of the present invention will be presented below.

The sheet bar used herein was the same as that used above. As the lead-silver alloy sheet to be rolled onto this sheet bar, a sheet having a thickness of 0.3 mm and containing 0.1% by weight of silver was prepared. A cold rolling was carried out, provided that the width of this sheet and the procedure for superposing it onto the sheet bar were the same as above.

As the result, owing to the presence of silver, the lead-silver alloy sheet could achieve good ductility and malleability, a sufficient prevention of passive state formation at the interface between sheet surface and active material and an improvement in corrosion resistance, and thereby it could improve the overcharge resistance characteristics at high temperatures. Further, the charging acceptability after super-discharging and standing could also be improved which was attributable to the preventive effect of the sheet bar on the self-discharge in storage, too.

The content of silver in the lead-silver alloy sheet is preferably 0.01–1.0% by weight. If it is lower than 0.01%, the sheet is insufficient in corrosion resistance, ductility and malleability and the prevention of passive state formation is also insufficient. If it is higher than 1.0%, the product is too high in cost and the lead-silver sheet is too high in ductility and malleability so that the lead-silver sheet slips on the surface of sheet bar at the time of pressure-bonding and no good pressure-bonding can be achieved, although such high a silver content is effective for exhibiting high corrosion resistance and passive state-prevention.

As above, the present invention can easily provide a grid for lead acid batteries excellent in the overcharge-resistance characteristics and recovery characteristics after overdischarging and standing.

Additionally, according to the invention, the surface treatment necessary for improving the performances of grid or battery can be applied to a limited necessary part, which enables a production of a grid without material loss.

What is claimed is:

1. A process for producing a grid for use in lead acid batteries which comprises superposing, on a sheet bar made of a lead-calcium alloy, a sheet or a foil of a lead-silver-tin alloy consisting of 0.01–0.5% by weight of silver, 1–8% by weight of tin and a residual quantity of lead, said sheet or foil of lead-silver-tin alloy having a thickness smaller that of the sheet bar, followed by pressure-bonding the sheet bar and the sheet or foil by cold rolling to form a sheet of which total thickness is smaller than that of the sheet bar, and subjecting the thin sheet obtained by the cold rolling as an elementary material to an expanding process or a punching process to obtain a grid.

2. A process for producing a grid for use in lead acid batteries according to claim 1, wherein said sheet bar consists of 0.05-0.1% by weight of calcium, 0.2-0.5% by weight 0.5% by weight of tin and a residual quantity of lead.

3. A process for producing a grid for use in lead acid batteries according to claim 1, wherein said sheet bar is an alloy consisting of 0.61-0.08% by weight calcium, 0.2-0.3% by weight of tin and a residual quantity of lead and said sheet or foil is an alloy consisting of 0.2-0.4% by weight of silver, 4-6% by weight of tin and a residual quantity of lead.

4. A grid for use in lead acid batteries which is constructed from a sheet bar larger of a lead-calcium-tin alloy and a layer, having a thickness smaller than that of the sheet bar and pressure-bonded onto at least one side of the sheet bar, of an alloy consisting of 0.01-0.5% by weight of silver, 1-8% by weight of tin and a residual quantity of lead and has grid meshes for holding a pasty active material.

5. A grid for use in lead acid batteries according to claim 4, wherein said grid has grid meshes produced by an expanding process.

6. A grid for use in lead acid batteries according to claim 4, wherein the mesh part of said grid is constructed of a material prepared by pressure-bonding and integrating a lead-calcium-tin alloy layer and a lead-silver-tin alloy layer and the lug for withdrawing current is constructed of a lead-calcium-tin alloy.

7. A grid for use in lead acid batteries according to claim 4, wherein said grid has a thickness of 0.6-1.5 mm and forms a lead-silver-tin alloy layer over a range of 0.5-1.0%, based on the total thickness of the grid, from its surface toward its inner part.

* * * * *